Jan. 27, 1942.  G. HOWE  2,270,948
MAP HOLDER
Filed March 5, 1940
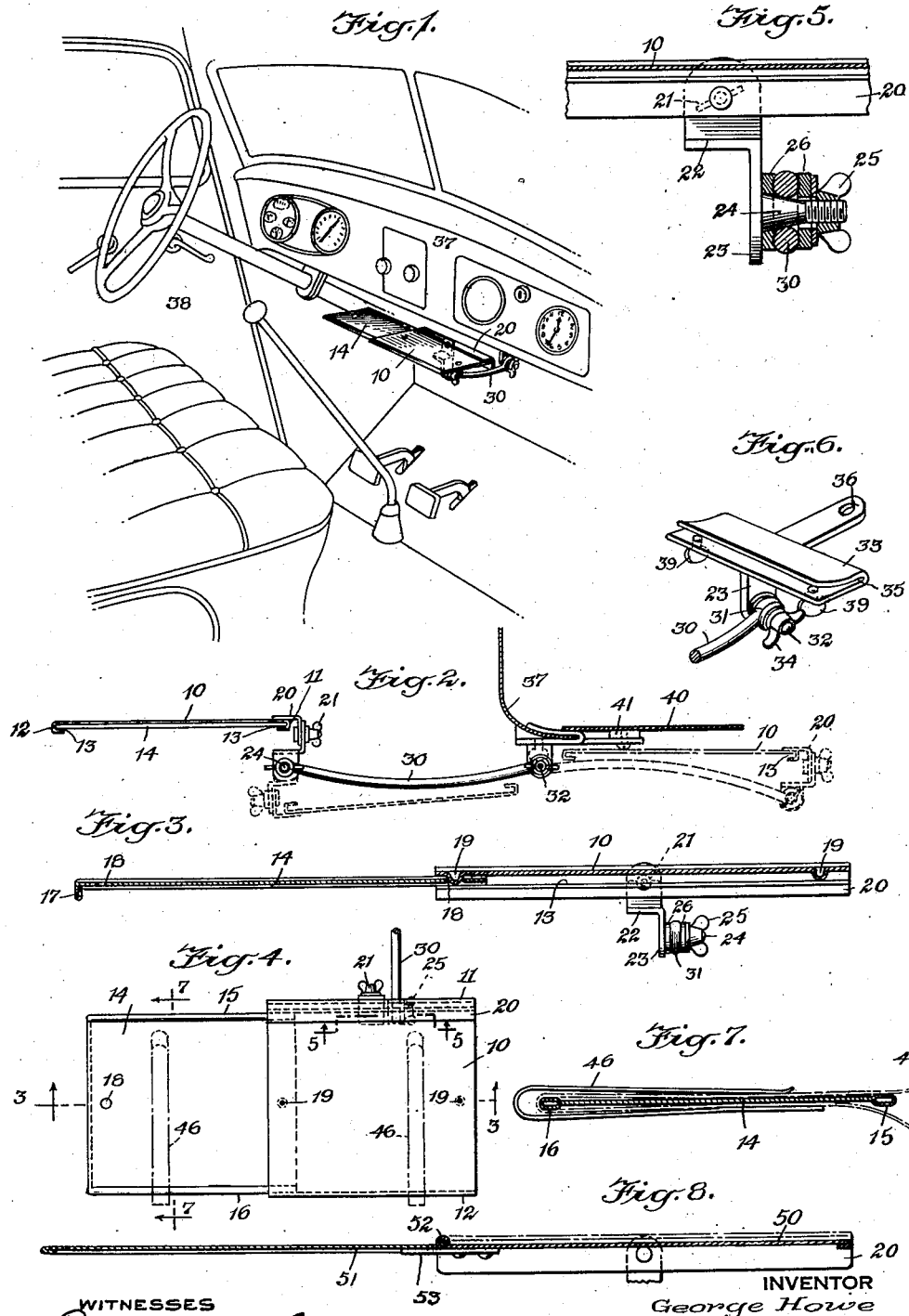
INVENTOR
George Howe
BY
ATTORNEYS
WITNESSES Patented Jan. 27, 1942

2,270,948

UNITED STATES PATENT OFFICE 2,270,948

MAP HOLDER

George Howe, Greenwich, Conn.

Application March 5, 1940, Serial No. 322,318

2 Claims. (Cl. 311—21)

This invention relates to an adjustable device designed to be used as a map holder but which has many obvious uses. The device may be used in an automobile, boat, airplane, or in any similar vehicle, and in fact is adaptable for use any place where a convenient support of this type is desired and where it is desirable to be able to hold the device out of the way when not in use.

For the purposes of illustration and description, the device is shown attached to an automobile. However, as heretofore stated, it may be attached to any object where its use is practical.

The purpose of the invention is to provide a map holder or similar article upon which a map or other article may be conveniently clamped and held in a position convenient to the eyes of the operator of the vehicle.

A further object is to provide a device of the character described which is economical in construction, simple to install, and which may be easily adjusted.

With these and other objects in view which will become apparent as the description proceeds, reference is had to the accompanying drawing, in which—

Fig. 1 is a perspective view of my device installed in a car;

Fig. 2 is a cross-sectional view showing the device installed and its position extended and folded;

Fig. 3 is a cross-sectional view taken on the line 3—3 of Fig. 4;

Fig. 4 is a plan view;

Fig. 5 is a detailed view of the means used in fastening the plate to the support;

Fig. 6 is a detailed view of the clamp used to fasten the device to the car;

Fig. 7 is a cross-sectional view taken on the line 7—7 of Fig. 4; and

Fig. 8 shows a modified view of the table member of my device.

Referring more particularly to the drawing, I provide a table member 10 having its front and rear edges 11 and 12 respectively bent upon themselves to form channels or guideways 13. Telescoped within the table member 10 is a second table member 14 having front and rear edges 15 and 16 respectively beaded for strength and its outermost end edge 17 turned down to form a stop limiting the action of the member 14 within the member 10. The member 14 is also provided with indentations or holes 18 adapted to cooperate with beads or knobs 19 impressed in the member 10 to fix the inner member 14 in its extended or telescoped position.

Along the front edge 11 is welded or otherwise fixed an angular member 20. Pivoted to the member 20 and adjustably attached thereto by the bolt and wing nut 21 is an elbow member 22 at the opposite end 23 of which is mounted a tapered screw or bolt 24 threaded at its outer end to receive a wing nut 25. The bolts 21 and 24 are disposed at a right angle with respect to each other. Washers 26 of leather or suitable material may be provided to insure a firm connection when the wing nut 25 is tightened.

Mounted on the tapered screw 24 is an arm 30 slightly bowed in shape and long enough to allow the table to be folded back upon it, as shown in Fig. 2. The arm 30 extends forwardly with respect to the table member 10 when the latter is in use. The forward end 31 of the arm 30 engages a bolt 32 mounted on a clamp member 33 and is held in place by the wing nut 34. The clamp member 33 is bent upon itself to form a channel 35 and has a projecting arm 36. The clamp member 33 is adapted to engage the metal instrument member 37 of an automobile or other vehicle 38 and to be fastened thereto by pressure of the thumb screws 39.

Most automobiles have an instrument board made of metal with a cardboard bottom 40. In order to steady the mounting a wooden block or other suitable leveling support 41 may be inserted between the cardboard bottom 40 and the arm 36.

It will be appreciated that while I have described a specific method of fastening my device to the instrument board, it may be fastened to the mechanism by means of screws, bolts, or other type of clamp. When the device is not in use, it may be folded under the instrument board 37, as shown by the dotted lines in Fig. 2. By loosening the wing nut 34 the arm 30 may be swung downwardly and rearwardly upward with respect to the instrument board and the wing nut then tightened. The wing nut 25 may then be loosened and the table member 10 swung downwardly, rearwardly and then upwardly in the position shown by the heavy lines in Fig. 2. Furthermore the table member 10 and its companion member 14 may be tilted on the bolt 24 when the nut 25 is loosened. The angle of the table may be regulated by loosening and adjusting the wing nut 21 and the inner table member 14 pulled out to extend the table portion laterally. In this manner the members 10 and 14 may be inclined rearwardly and downwardly as well as laterally different degrees for convenience in writing or examining matter on said members. Maps, cards or other articles 45 may then be placed on the table members and held in position by means of the clamps 46.

It will be appreciated that by manipulation of the wing nuts, the table member may be tilted in any angle convenient for the driver's vision.

It will also be appreciated that the whole unit may be easily installed or removed at will, and that when not in use it is swung up out of the way, as shown by the dotted lines in Fig. 2.

In the modified form of my invention, as shown in Fig. 8, the table member 50 is supported by the angle member 20. Hinged thereto is the secondary table member 51 supported by means of the piano hinge 52 and braced by a supporting member 53 riveted or screwed to the member 50. It will be appreciated that the member 51 may be folded over and on the member 50 when not in use.

It will also be appreciated that due to the size and shape of my device it will not detract from the leg room in an automobile or similar vehicle and will act as a receptacle for data not only for the driver but for any person on the front seat.

I claim:

1. In a device of the character described, an element providing a flat supporting surface, a swingable arm, a nut and bolt on the front end of said arm to provide a pivotal connection, attaching means for the device connected with said bolt, a second nut and bolt on the rear end of said arm to provide a second pivotal connection, an angular member connected with said second bolt, a second angular member connected with said element, and a third nut and bolt, said third bolt extending through said angular members to provide a third pivotal connection, the provision and arrangement being such that said element may be held horizontally or in different laterally and/or rearwardly angular positions, and also that said element may be swung to an out-of-the-way position.

2. In a device of the character described, a table, a swingable arm, a nut and bolt on the front end of said arm to provide a pivotal connection, attaching means for the device connected with said bolt, a second nut and bolt engaged with the rear end of said arm to provide a second pivotal connection, an angular member on which said second bolt is fixed, and means pivotally connecting said angular member with the front side of said table, the provision and arrangement being such that said table may be held horizontally or in different angular positions and/or rearwardly angular positions, and also that said table may be swung to an out-of-the-way position.

GEORGE HOWE.